(12) United States Patent
Kirihata et al.

(10) Patent No.: US 8,954,633 B2
(45) Date of Patent: Feb. 10, 2015

(54) INFORMATION PROCESSING APPARATUS, INFORMATION PROCESSING METHOD, AND COMPUTER-READABLE STORAGE MEDIUM

(75) Inventors: Daiji Kirihata, Tokyo (JP); Hisashi Ishikawa, Urayasu (JP); Hirowo Inoue, Kawasaki (JP); Isao Sakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 12/769,125

(22) Filed: Apr. 28, 2010

(65) Prior Publication Data

US 2010/0281237 A1 Nov. 4, 2010

(30) Foreign Application Priority Data

May 1, 2009 (JP) ................................. 2009-112053

(51) Int. Cl.
*H04L 12/28* (2006.01)
*G06F 15/173* (2006.01)
*H04L 12/42* (2006.01)
*H04L 12/801* (2013.01)
*H04L 12/46* (2006.01)

(52) U.S. Cl.
CPC .......... *G06F 15/17337* (2013.01); *H04L 47/13* (2013.01); *H04L 12/42* (2013.01); *H04L 12/4637* (2013.01)
USPC ............................................. 710/29; 370/258

(58) Field of Classification Search
CPC ................................. H04L 47/13; H04L 12/42
USPC ........................................ 370/229, 258, 453
See application file for complete search history.

(56) References Cited

U.S. PATENT DOCUMENTS

| | | | |
|---|---|---|---|
| 7,551,561 B2 * | 6/2009 | Sawabe | 370/235 |
| 7,746,772 B2 * | 6/2010 | Makino | 370/229 |
| 2002/0015413 A1 * | 2/2002 | Kaganoi et al. | 370/403 |
| 2003/0076781 A1 * | 4/2003 | Enomoto et al. | 370/229 |
| 2003/0133406 A1 * | 7/2003 | Fawaz et al. | 370/229 |
| 2006/0250986 A1 * | 11/2006 | Alharbi et al. | 370/258 |
| 2007/0064722 A1 * | 3/2007 | Fang | 370/452 |
| 2007/0223373 A1 * | 9/2007 | Sato et al. | 370/229 |
| 2011/0087863 A1 | 4/2011 | Watanabe et al. | |

FOREIGN PATENT DOCUMENTS

| | | | |
|---|---|---|---|
| JP | 2522952 B2 | 8/1996 | |
| JP | 3034405 B2 | 4/2000 | |
| JP | 2006-295690 A | 10/2006 | |
| JP | 2007-259318 A | 10/2007 | |

* cited by examiner

*Primary Examiner* — Ernest Unelus

(74) *Attorney, Agent, or Firm* — Canon USA Inc. IP Division

(57) ABSTRACT

In an information processing apparatus in which data processing is performed in a predetermined sequence by processing modules connected to a ring bus, if an amount of data generated by input data in the ring bus is not considered, the data amount exceeds an amount of data that can be held by the processing modules on the ring bus, and a data collision often occurs, so that processing efficiency of the ring bus deteriorates. An amount of data input into the ring bus is controlled so that the total sum of data amounts output to the ring bus from processing units used for processing does not exceed a maximum amount of data that can be held by the processing modules on the ring bus.

23 Claims, 10 Drawing Sheets

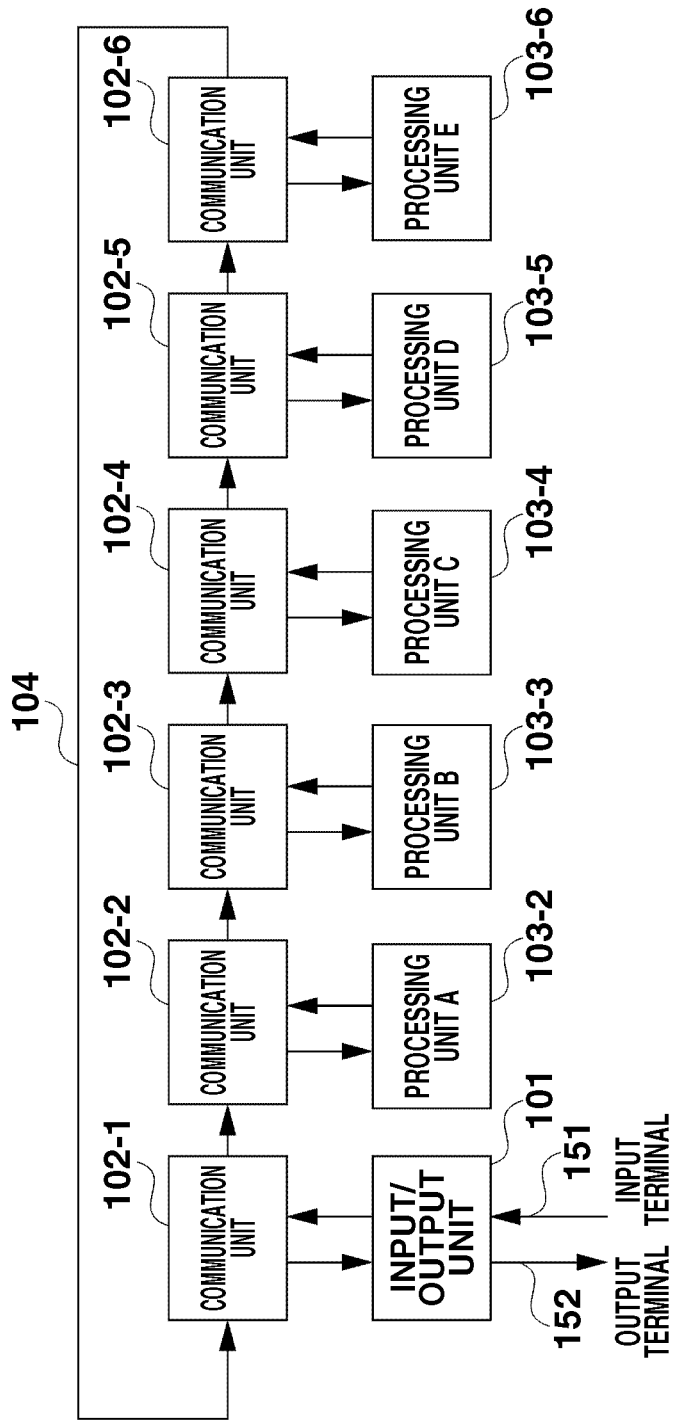

INFORMATION PROCESSING APPARATUS, INFORMATION PROCESSING METHOD, AND COMPUTER-READABLE STORAGE MEDIUM

BACKGROUND OF THE INVENTION

1. Field of the Invention

The present invention generally relates to information processing and, more particularly, to an information processing apparatus in which a plurality of processing modules are connected to a ring-shaped bus, an information processing method, and a computer-readable storage medium.

2. Description of the Related Art

Conventionally, there are various methods for controlling bus traffic in an information processing apparatus that uses a plurality of processing modules connected by a ring-shaped bus.

For example, when a variable depth first in first out (FIFO) is arranged on a bus, and output data is output from a processing module, if there is data on the ring (communication unit of the processing module), the two data compete with each other. Therefore, there is discussed a method for, when the competition occurs, deepening the depth of the FIFO to generate empty slots, and preventing the performance of the entire system from significantly deteriorating in Japanese Patent No. 2,522,952.

Also, there is discussed a method in which, for congestion control of a local area network including a plurality of nodes, each node shares network usage status of all the nodes, and a node that wants to start communication determines whether the communication is allowed on the network from the usage status of each node, and then starts communication in Japanese Patent No. 3,034,405.

Here, an information processing apparatus is considered in which a ring type data bus (hereinafter referred to "ring bus") is formed by stringing a plurality of processing circuits (processing modules) together in a daisy-chain connection by a bus to connect the processing circuits in a ring shape. In a processing apparatus using a ring bus, when data is controlled to circulate only in one direction to simplify the configuration of the processing apparatus, if an amount of data which can be held in each processing module on the ring bus is not taken into consideration, a data collision often occurs, and processing efficiency of the ring bus deteriorates.

SUMMARY OF THE INVENTION

The present invention is directed to an information processing apparatus, an information processing method thereof, and a program or computer-readable storage medium for storing the program capable of appropriately controlling a traffic amount on a ring bus with a simple configuration.

According to an aspect of the present invention, an information processing apparatus includes a plurality of processing modules, a ring bus configured to connect the plurality of processing modules in a ring shape and circulate data in one direction, a holding unit configured to hold information indicating a processing sequence and a processing content of the plurality of processing modules as processing information, a calculation unit configured to calculate a data amount to be held by the plurality of processing modules according to data input into the ring bus based on the processing information, and an input unit configured to input data into the ring bus so that the data amount to be held by the plurality of processing modules is smaller than or equal to a data amount that can be held by the plurality of processing modules.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a schematic configuration of an information processing apparatus.

DESCRIPTION OF THE EMBODIMENTS

Various exemplary embodiments, features, and aspects of the invention will be described in detail below with reference to the drawings.

Figure 6:
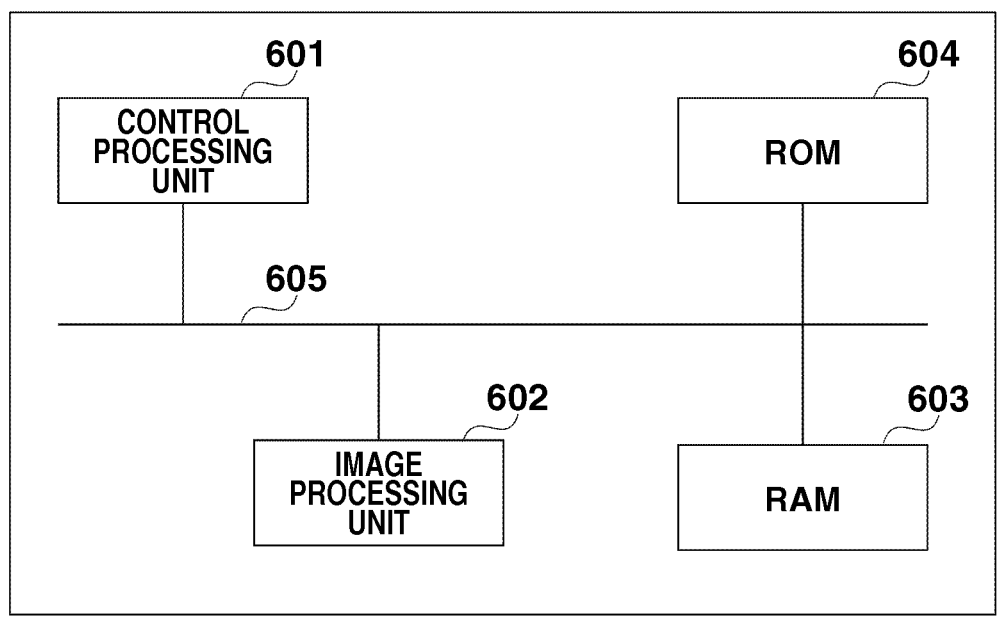
FIG. 6 is a block diagram illustrating a schematic configuration of the information processing apparatus.

FIG. 6 is a block diagram illustrating a schematic configuration of a system according to a first exemplary embodiment of the present invention.

A control processing unit 601 is a processing circuit such as a central processing unit (CPU), a micro-processing unit (MPU), and/or the like. An image processing unit 602 is an image processing unit including a plurality of modules connected by a ring bus. A random access memory (RAM) 603 is a readable/writable memory for storing input image data before processing, output image data after processing, data related to a setting parameter of the image processing unit 602, and the like.

A read-only memory (ROM) 604 is a readable memory capable of holding a processing procedure of the control processing unit 601 and the image processing unit 602, constants such as a setting parameter, and the like. A system bus 605 is a bus that enables communication among the control processing unit 601, the image processing unit 602, the RAM 603, and the ROM 604.

The control processing unit 601 performs a system control, instruction to the image processing unit 602, and/or the like, according to a program read from the ROM 604. The image processing unit 602 performs image processing according to an instruction from the control processing unit 601. For example, the image processing unit 602 reads input image data preliminarily stored in the RAM 603, processes the input image data, and writes the processed result into the RAM 603 again.

Figure 10:
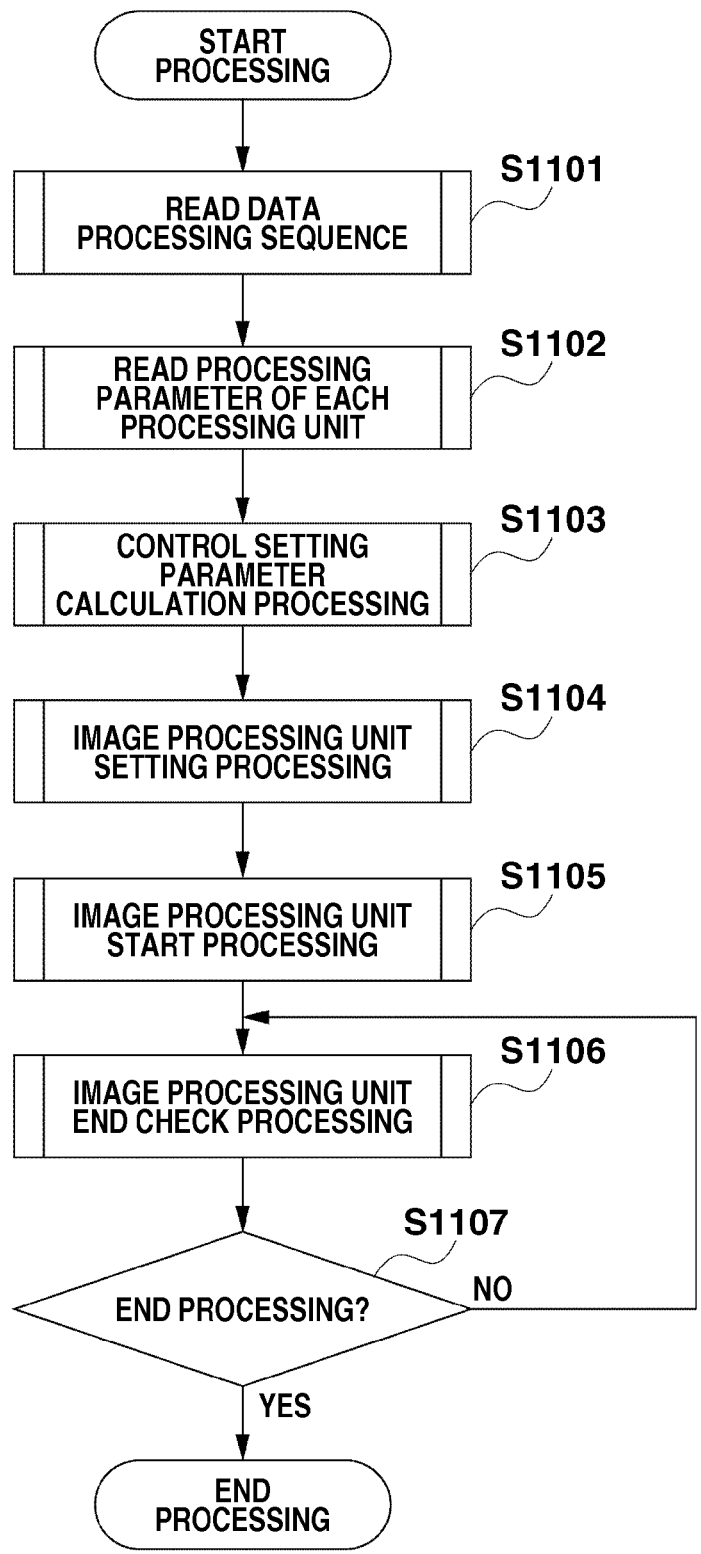
FIG. 10 is a flowchart illustrating setting processing performed by the control processing unit on an image processing unit.

FIG. 10 illustrates a processing procedure of setting processing of the image processing unit 602 by the control processing unit 601.

When the image processing is started, the processing is performed according to the steps described below. In step S1101, the control processing unit 601 reads a processing sequence of the processing unit of the image processing unit 602 from the ROM 604. In step S1102, the control processing unit 601 reads a processing parameter that is provided to the processing unit from the ROM. In step S1103, the control processing unit 601 performs processing for calculating a control parameter of the image processing unit 602 by using the data processing order and the processing parameter that have been read.

In step S1104, the control processing unit 601 performs the setting processing on the image processing unit 602 by using the control parameter calculated in step S1103. In step S1105, the control processing unit 601 instructs the image processing unit 602 to start the processing. In step S1106, the control processing unit 601 checks the end of the setting of the image processing unit 602.

In step S1107, when it is determined that the setting processing ends (YES in step S1107), the control processing unit 601 ends the processing. When the setting processing does not end (NO in step S1107), the control processing unit 601 returns to step S1106 and continues the end check processing.

FIG. 1 is a block diagram illustrating a schematic configuration of the image processing unit according to the first exemplary embodiment. The arrows in FIG. 1 indicate a direction (corresponding to a data flow direction) in which data (or packet) is transmitted.

A data input/output unit 101 receives data to be processed from an external storage apparatus (ROM, RAM, or HDD), inputs the data in the ring bus, and outputs the processed data to the external storage apparatus.

Communication units 102-1 to 102-*m* are strung together in a daisy-chain connection by a bus and form a ring bus 104, and are collectively referred to hereinafter as "the communication unit 102". Processing units 103-1 to 103-*m* are respectively connected to at least one of the communication units 102-1 to 102-*m*, and perform predetermined processing on the input data, and are collectively referred to hereinafter as "the processing unit 103".

On the ring bus 104, the communication unit 102 sends data received from a communication unit in a certain direction to another communication unit. Therefore, on the ring bus 104, generally, when assuming that a predetermined one direction is defined as a data transmission direction, data flows to circulate from upstream to downstream in the transmission direction. When assuming that the communication unit is a part of the ring bus, the ring bus functions as a shift register which shifts a packet on the ring bus downstream every predetermined clock.

The communication unit 102 is directly connected to at least one processing unit 103 or the data input/output unit 101 (this may be a data input unit) besides the above-described bus so that the communication unit 102 can transmit/receive data to/from the processing unit 103 or the data input/output unit 101. The communication unit 102 recognizes the data input through the bus, and outputs data, which should be transmitted to the processing unit or the data input/output unit, which is directly connected to the communication unit 102, to the processing unit or the data input/output unit.

On the other hand, the communication unit 102 transmits data, which should not be transmitted to the processing unit or the data input/output unit, which is directly connected to the communication unit 102, to the communication unit on the downstream side in the data transmission direction without change. The details of the communication unit 102 will be described below. A pair of the communication unit 102 and the processing unit 103 is referred to as a processing module (or processing circuit) in this specification. The ring bus 104 is a bus, which strings the communication units together in a daisy-chain configuration.

Figure 3:
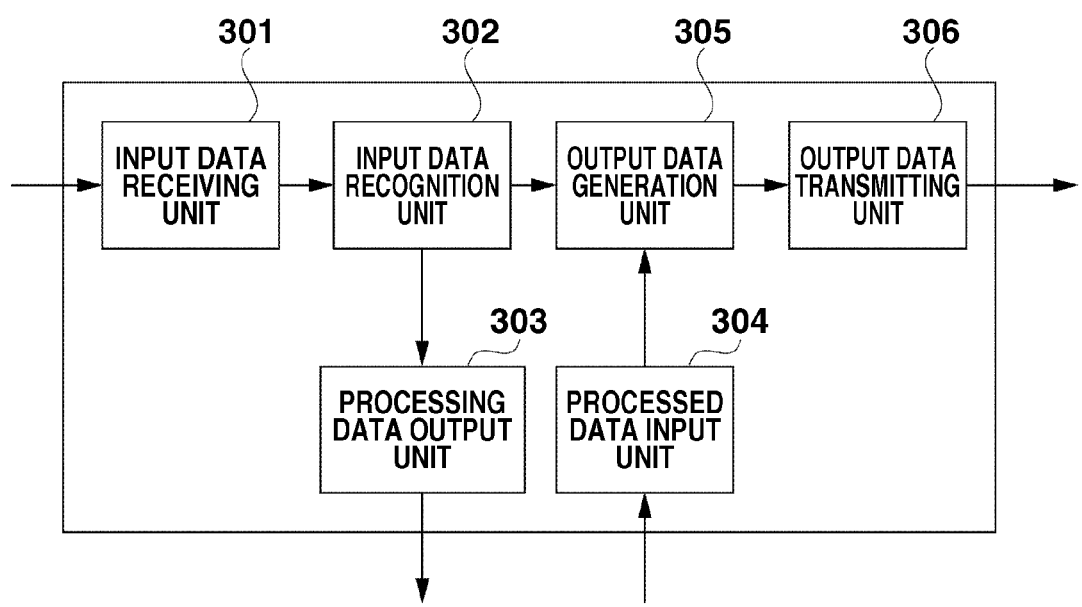
FIG. 3 is a block diagram illustrating a schematic configuration of a communication unit connected to a data input/output unit or a processing unit.

FIG. 3 illustrates a schematic configuration of the communication unit 102. An input data receiving unit 301 receives a packet flowing on the ring bus. An input data recognition unit 302 checks control information of the input packet, and determines whether the input data should be processed in this node.

A processing data output unit 303 transmits data that is determined to be the data that should be processed in this node by the input data recognition unit 302 to the processing unit. When the data to be determined by the input data recognition unit 302 is packetized, the processing data output unit 303 may extract data that should be processed in the processing unit from the packet. A processed data input unit 304 receives an input of data that has been processed in the processing unit of this node (processing unit directly connected without using the bus).

An output data generation unit 305 generates output data (output packet) from an empty packet which is determined not to include valid data and data transmitted from the processed data input unit 304. An output data transmitting unit 306 outputs the output data generated by the output data generation unit 305 to the bus.

Figure 2A:
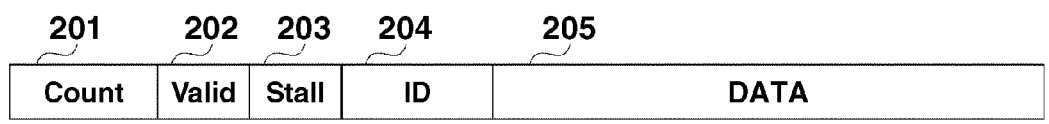
FIG. 2A illustrates a format of a data packet flowing on a ring bus.
Figure 2B:
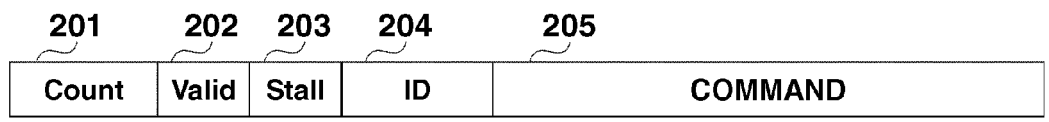
FIG. 2B illustrates a format of a command packet flowing on the ring bus.

FIGS. 2A and 2B illustrate data structures of a data packet and a command packet transmitted/received by a data communication processing unit like the above-described communication unit.

A field 201 is a counter that indicates an order of data to be processed. In the ring bus of this exemplary embodiment, a part of data packets including data that has not been processed may circulate in the ring, and hence, data received by the communication processing unit is not necessarily the data that should be processed first by a corresponding data processing unit.

Therefore, by adding such a counter to the data, it is possible to perform processing according to a correct order such as the order of inputting. The corresponding data processing unit means a data processing unit with which the communication processing unit can directly communicate without using the ring bus.

A field 202 is a flag, which indicates that the data held by this data packet is valid data that should be processed. In other words, the flag has the same meaning as a flag that indicates whether the packet is currently in use. Hereinafter, the flag is referred to as "valid bit".

A field 203 is a flag, which indicates that the data held by this packet is not received by a data processing unit that should process the data for some reason. This flag has the same meaning as a data supply stop request bit (disable signal) to the previous stage in a normal pipeline connection. Hereinafter, the flag is referred to as "stall bit".

A field 204 is an identifier (ID) of the data processing unit that has processed this data for the last time. The data communication processing unit compares a waiting ID specified externally in advance with the ID on the data packet, and if both IDs match each other, the data communication processing unit performs processing. Normally, the waiting ID is a value unique to each processing unit. A field 205 stores data.

Conceptually, the total number of packets flowing on the ring bus is approximately constant, in other words, the sum of the number of empty packets and the number of valid packets is approximately constant, and the constant number of packets circulate continuously around the ring bus. The empty packet is a packet whose data is invalid, and the valid packet is a packet that stores data or command. In this exemplary embodiment, one pixel data is assigned to one data packet.

Figure 4:
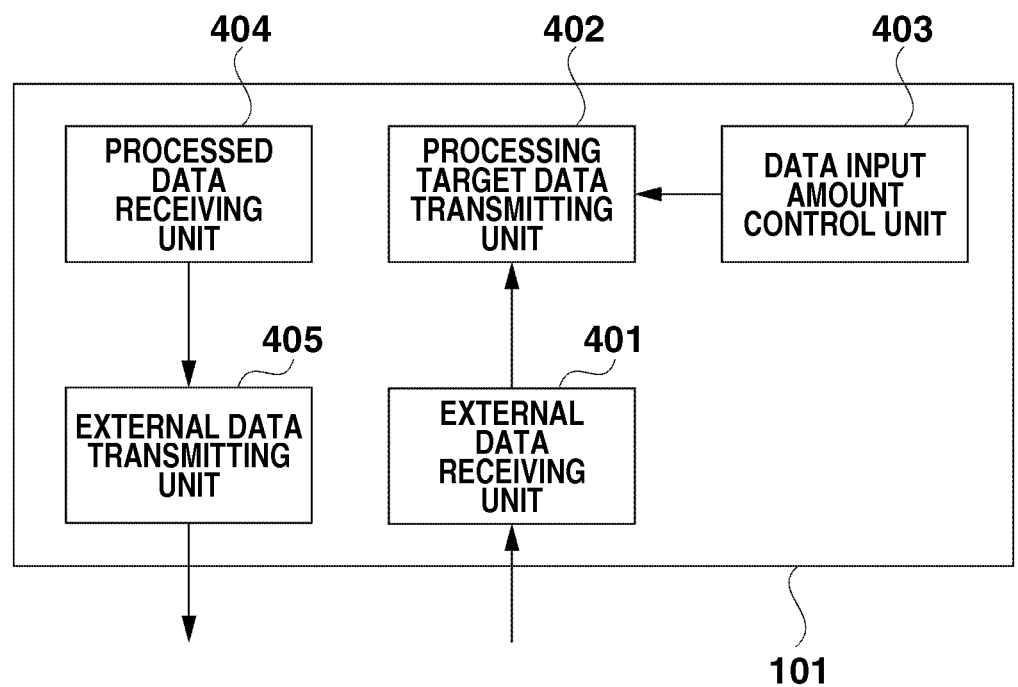
FIG. 4 is a block diagram illustrating a schematic configuration of the data input/output unit.

FIG. 4 is a block diagram illustrating a schematic configuration of the data input/output unit 101 of the image processing unit illustrated in FIG. 1.

An external data receiving unit 401 receives data from an external storage apparatus. A processing target data transmitting unit 402 transmits the data received by the external data receiving unit 401 to the communication unit on the ring bus. A data input amount control unit 403 determines an amount of data (or an interval between packets) transmitted to the communication unit by the processing target data transmitting unit 402.

Here, the amount of data may be an amount of data transmitted at one time when the processing target data transmitting unit 402 dividedly transmits a series of data to the communication unit. A processed data receiving unit 404 receives processed data from the communication unit. An external data transmitting unit 405 transmits the data received by the processed data receiving unit 404 to an external storage apparatus.

Figure 5:
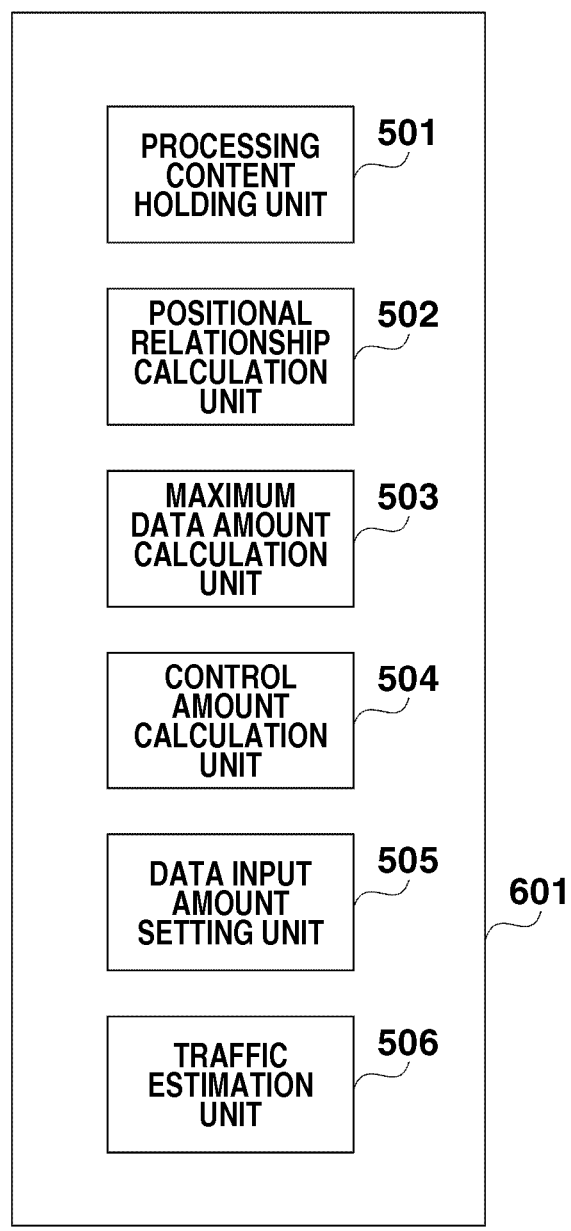
FIG. 5 is a block diagram illustrating a schematic configuration of a control apparatus.

FIG. 5 is a block diagram illustrating a schematic functional configuration of the control processing unit 601 illustrated in FIG. 6.

A processing content holding unit 501 holds processing content of each processing unit in the image processing unit (for example, image processing such as variable magnification, filtering, and the like), parameters and data used for processing, information indicating an order of processing performed by the processing units, and the like. A positional relationship calculation unit 502 calculates a value indicating a positional relationship between two continuous processing units in the processing in a series of data flows (such as pipeline processing).

A maximum data amount calculation unit 503 (second calculation unit) calculates a maximum data amount that can be held by a plurality of processing modules connected to the ring-shaped bus. A control amount calculation unit 504 (third calculation unit) calculates a control amount to be set in the data input amount control unit from information held by the processing content holding unit 501, the positional relationship calculation unit 502, and the maximum data amount calculation unit 503.

A data input amount setting unit 505 sets the control amount calculated by the control amount calculation unit 504 in the data input amount control unit 403 in FIG. 4. A traffic estimation unit 506 (first calculation unit) estimates an amount of data that actually flows on the ring bus (the amount corresponds to the total sum of data amount held by the processing modules) based on data input into the ring bus.

Next, an operation example in which data stored in one packet by the image processing unit 602 in FIG. 6 having the configuration described above is processed in a sequence of a processing unit B to a processing unit D to a processing unit A will be described with reference to FIG. 1.

First, when initial setting is performed on the image processing unit 602 to determine the data flow of B to D to A, node IDs 1 to 6 are sequentially set to the communication units 102-1 to 102-6, and further the waiting IDs (wIDs) are set. As setting of the waiting IDs, [wID=2] is set to the communication unit 102-1, [wID=5] is set to the communication unit 102-2, [wID=1] is set to the communication unit 102-3, and [wID=3] is set to the communication unit 102-5.

Here, the waiting ID is used for the communication unit 102 to determine whether a packet is a packet from which data should be extracted, and is set in a register included in each communication unit when the initial setting is performed. Each communication unit includes a counter, and all the counters are initialized to 0 at the initial setting of the image processing unit 602.

First, the data input/output unit 101 inputs data received from an input terminal 151 into the communication unit 102-1. The communication unit 102-1 packetizes the input data and node ID "1" into a packet, and outputs the packet to the downstream of the ring bus 104. According to the format in FIG. 2, [Count=0, Valid=1, Stall=0, ID=1] are stored in the packet. After outputting the packet, the communication unit 102-1 increments the counter thereof from 0 to 1, and stands by so that [Count=1] is stored in the next packet.

The input data recognition unit 302 of the communication unit 102-2 determines whether the packet received from the bus satisfies the following two conditions:
(1) Node ID of the packet received from the bus matches the wID of the communication unit 102-2.
(2) The value of the counter in the packet matches the value of the counter of the communication unit 102-2. In this example, wID is not set in the communication unit 102-2, and hence the Node ID does not match the wID. Therefore, the packet is determined not to be a packet that should be processed by the processing unit A of this node, and the packet is output to the downstream side of the ring bus without change.

Next, the input data recognition unit 302 of the communication unit 102-3 also determines whether the packet received from the bus satisfies the above two conditions. In this case, the packet satisfies the above two conditions, so that the packet is determined to be a packet that should be processed by the processing unit B, and data is extracted from the packet. At least the valid bit of the packet from which the data has been extracted is cleared to [Valid=0], and the packet is changed to an empty packet. Then, the packet is output from the output data transmitting unit 306 to the downstream side of the ring bus 104 in the data transmission direction.

The data extracted by the communication unit 102-2 is transmitted from the processing data output unit 303 to the processing unit B. The processing unit B processes the data, and then transmits the processed data to the processed data input unit 304 of the communication unit 102-3.

When the processed data input unit 304 holds processed data, if the output data generation unit 305 of the communication unit 102-3 receives an empty packet, the output data generation unit 305 performs processing for storing the processed data in the packet. Specifically, the output data generation unit 305 stores the processed data, ID [ID=3] of this node, and the counter value [Count=0] of this node in the empty packet, and sets the valid bit to "valid" [Valid=1]. Thereafter, the communication unit 102-3 increments the counter of this node by 1 from 0 to 1, and waits for the next packet.

The subsequent processing is basically the same as the processing of the above-described communication unit 102-2 or the communication unit 102-3, so that the description of the same processing will be omitted.

The output packet generated by the output data generation unit of the communication unit 102-2 is output from the output data transmitting unit 306 to the bus. Next, the packet passes through the communication unit 102-4 without change in the same way as in the communication unit 102-2. When the packet reaches the communication unit 102-5, the packet is processed in the same way as in the communication unit 102-3, and data processed by the processing unit D and the ID [ID=5] of this node are stored in the packet.

The packet that stores the data processed by the processing unit D sequentially passes through the communication unit 102-6 and the communication unit 102-1, and the packet is processed in the communication unit 102-2 in the same way as in the communication unit 102-3. The packet that stores the data processed by the processing unit A stores information of [ID=2]. Therefore, the packet passes through the communication units 102-3 to 102-6, and data is extracted from the packet in the communication unit 102-1, and further, the packet is output from the data input/output unit to the outside of the image processing unit.

As the image processing unit 602 operates as described above, although the packet continuously circulates on the ring bus in one direction, it is possible to realize a data flow based on the setting of the wIDs. By changing the setting of the wIDs, it is possible to switch the data flow to a desired one.

The interval at which the data input/output unit 101 inputs data into the communication unit 102-1 is set by the data input amount setting unit of the control processing unit 601. The interval set here is a static value. The value is calculated by the control processing unit 601 before the image processing unit 602 starts the processing, and is set in the image processing unit 602.

One unit (unit time) of the interval is defined as the time from when a packet is input into a data communication processing unit and processing is performed on the packet to when the packet is output. It is assumed that the data communication processing units are synchronized, and all the data communication processing units perform the processing from when a packet is input to when the packet is output in the same time period.

The number of times the data input/output unit 101 inputs data into the communication unit is determined according to the size of an image desired to be processed. For example, when processing an image of 20 pixels in height and 100 pixels in width, the number of times of inputting data is 2000 times. In such a case, data processing is performed in parallel in each processing unit, and data amount of the packets flowing on the ring bus is in equilibrium.

The control processing unit 601 estimates a data amount held by the processing modules on the ring bus in equilibrium when the data input/output unit inputs data into the communication unit at a certain interval, and sets an interval at which the estimated data amount is smaller than or equal to the data amount that can be held by the processing modules on the ring bus.

Figure 7:
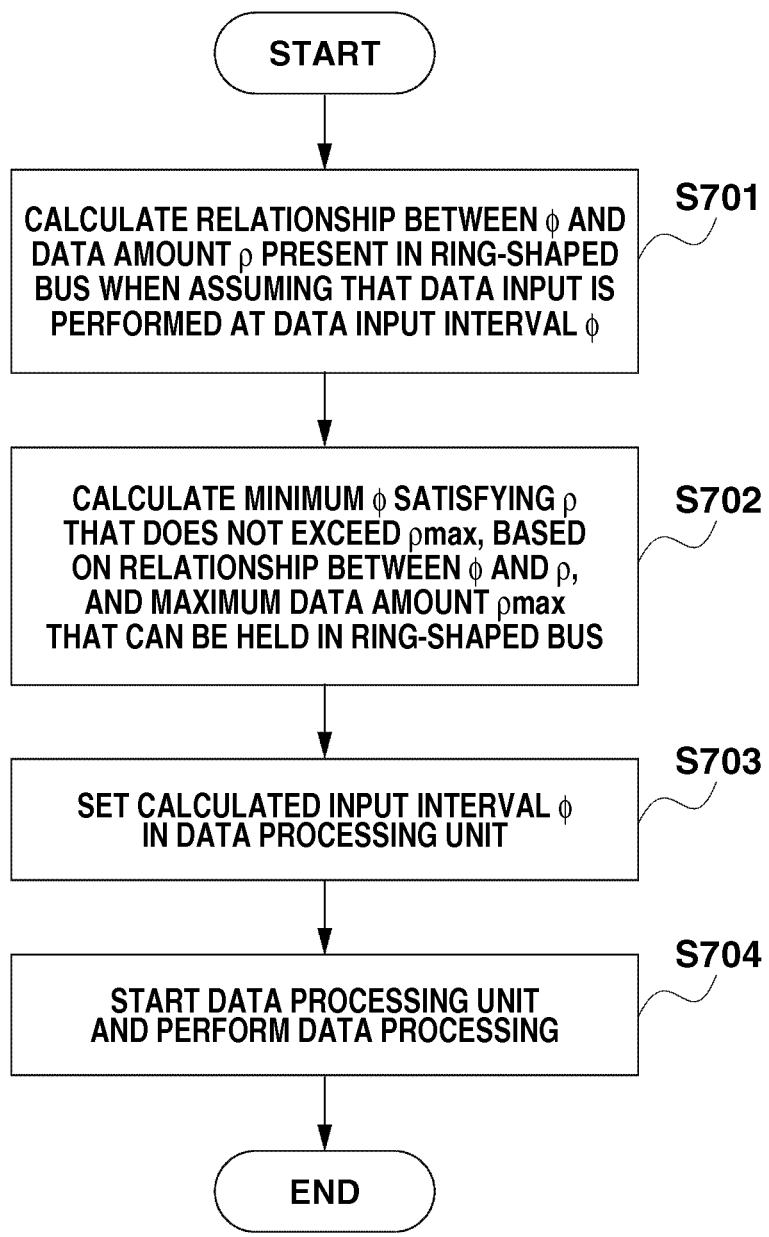
FIG. 7 is a flowchart illustrating setting processing and starting processing performed by a control processing unit on an information processing unit.

FIG. 7 is a flowchart illustrating processing of the control processing unit 601 before the image processing is performed by the image processing unit 602.

When it is assumed that the interval is set as $\phi$ in step S701, the control processing unit 601 obtains a data amount output to the ring bus by each processing unit used for the processing, and calculates a data amount $\rho$ which flows on the ring bus when the $\Phi$ is set. In step S702, the control processing unit 601 compares the data amount $\rho$ calculated in step S701 with a maximum data amount $\rho max$ that can be held by the processing modules on the ring bus, and calculates minimum $\phi$ satisfying $\rho$ that does not exceed $\rho max$.

By repeating steps S701 and S702, the control processing unit 601 calculates the interval described above. Further, in step S703, the control processing unit 601 sets the interval calculated in step S702 in the image processing unit 602, and in step S704, starts the image processing unit 602 to perform the data processing.

Figure 8:
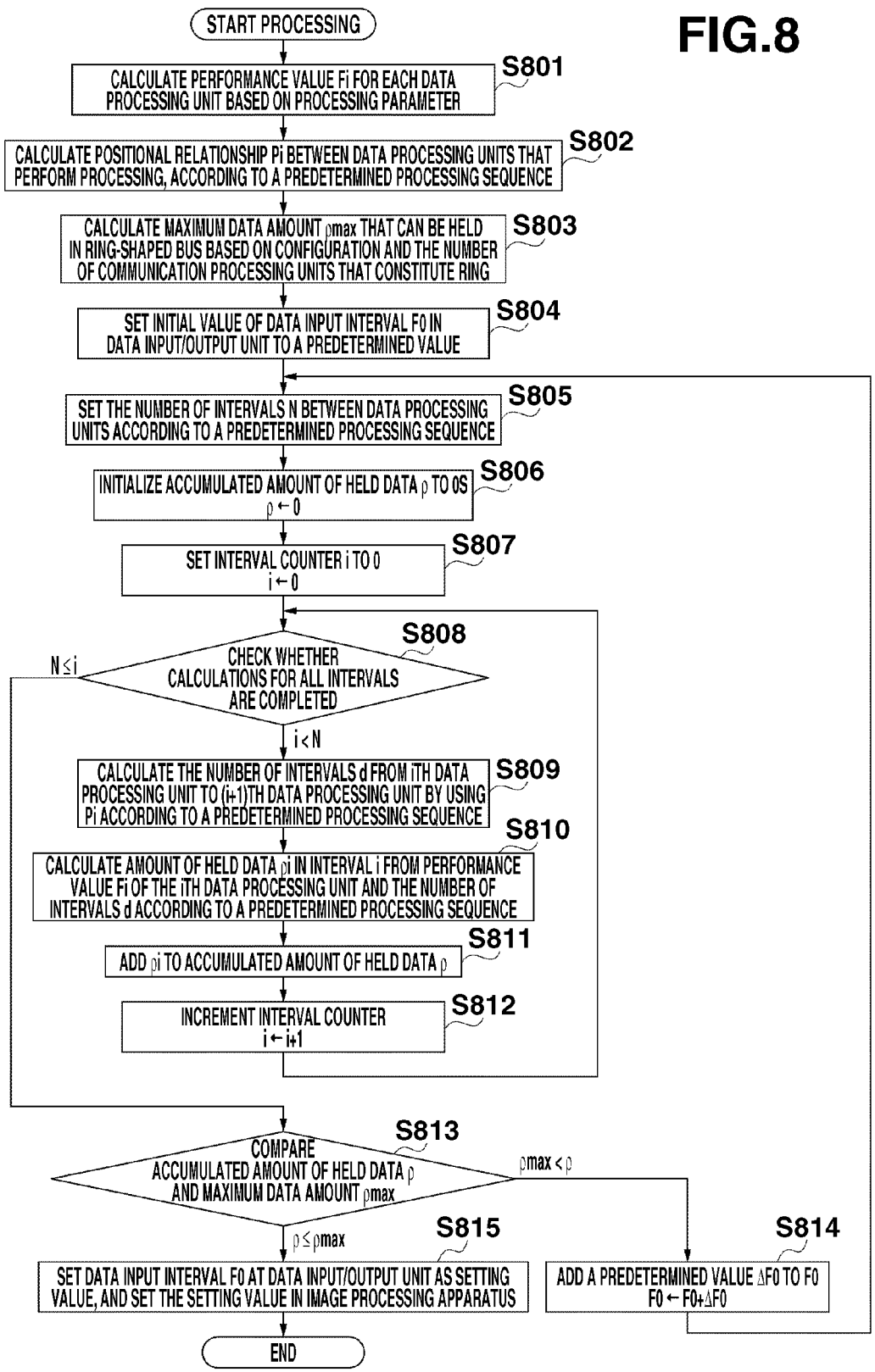
FIG. 8 is a flowchart illustrating details of the setting processing performed by the control processing unit on the information processing unit.

FIG. 8 is a flowchart illustrating calculation processing of the setting value set in the image processing unit 602, and setting processing of the setting value in the image processing unit 602, which are performed by the control processing unit 601.

In step S801, the control processing unit 601 calculates a processing performance $F_i$ of each processing unit based on a predetermined processing content. Here, $F_i$ is a formula representing a relationship between the interval $\phi_i$ of inputting data into the processing unit and the interval $\phi_{i+1}$ of outputting from the processing unit, and $F_i$ is approximated by a primary expression based on the processing content. The form of the primary expression is $1/\phi_{i+1}=A_i(1/\phi_i-B_i)$, and wherein $A_i$ and $B_i$ are fixed values obtained from the processing content.

In step S802, the control processing unit 601 calculates a positional relationship $P_i$ between the data processing units that perform processing, according to a predetermined processing sequence. Here, the positional relationship $P_i$ indicates a logical position of the processing unit which performs the ith processing, and corresponds to the number of communication units through which the packet passes when the data is transmitted from the data input/output unit to the processing unit based on the data input/output unit.

In step S803, the control processing unit 601 calculates a maximum data amount $\rho max$ that can be held by the processing modules on the ring bus based on the configuration and the number of communication units that constitute the ring. Here, when assuming that the packets on the ring bus uniformly have a data amount of 64 bits, the maximum data amount $\rho max$ is a value obtained by multiplying 64 bits by the number of the communication units.

In step S804, the control processing unit 601 sets an initial value of a data input interval $F_0$ in the data input/output unit to a predetermined value.

In step S805, the control processing unit 601 sets the number of intervals N between the processing units used for processing according to a predetermined processing order. Here, the number of intervals N is the number of the processing units, in which data is processed after the data is input into the ring-shaped bus from the data input/output unit, and the data input/output unit. For example, the number of intervals N is 4 in the use case of FIG. 6.

In step S806, the control processing unit 601 initializes an accumulated amount of held data $\rho$ to 0. In step S807, the control processing unit 601 sets an interval counter i to 0. In step S808, the control processing unit 601 checks whether the calculations for all the intervals are completed. When the interval counter i is smaller than the number of intervals N between the processing units, the process proceeds to step S809, and when the interval counter i is larger than or equal to the number of intervals N, the process proceeds to step S813.

In step S809, the control processing unit 601 calculates the number of intervals d from the ith processing unit to the (i+1)th processing unit by using $P_i$ according to a predetermined processing sequence. Here, the 0th processing unit and the Nth processing unit are the input/output unit. In step S810, the control processing unit 601 calculates an amount of held data $\rho_i$ in the interval i from the number of intervals d and the performance value $F_i$ of the ith processing unit according to a predetermined processing sequence.

In step S811, the control processing unit 601 adds $\rho_i$ to the accumulated amount of held data $\rho$. In step S812, the control processing unit 601 increments the interval counter. When step S812 is completed, the process proceeds to step S808.

In step S813, the control processing unit 601 compares the accumulated amount of held data ρ with the maximum data amount ρmax. When ρ exceeds ρmax, the process proceeds to step S814, and when ρ is smaller than or equal to ρmax, the process proceeds to step S815.

In step S814, the control processing unit 601 adds a predetermined value $\Delta F_0$ to the data input interval $F_0$ at the data input/output unit. In step S815, the control processing unit 601 sets the data input interval $F_0$ at this time at the data input/output unit as the setting value, and sets the setting value in the data input amount control unit 403.

As described above, in the first exemplary embodiment, a data amount flowing on the ring bus in equilibrium is calculated as an estimated value based on input data, and the data amount input into the ring bus is adjusted so that the estimated value is smaller than or equal to the data amount which can be held by a plurality of processing modules on the ring bus.

In this way, it is possible to suppress deterioration of processing efficiency of the ring bus. The data amount that can be held by a plurality of processing modules on the ring bus corresponds to a maximum traffic, which does not deteriorate the processing efficiency of the ring bus.

In the above description, a unit, such as the input/output unit 101 in FIG. 1, which includes both the input unit to the ring bus and the output unit from the ring bus is used, however, the input unit and the output unit may be separated from each other.

When handling both the command packet and the data packet in the ring bus, if the data amount of the command packet illustrated in FIG. 2B is negligibly small, it is possible to use only the intervals between the data packets illustrated in FIG. 2A. When both the command packet and the data packet can be handled in the ring bus, the number of wiring lines can be simply decreased, and thus the circuit scale can be reduced.

To obtain the data amount that is held by the processing modules on the ring bus when the data is input into the ring bus, the packets circulating on the ring bus can be used. It is recommended to consider the occurrence rate of packets that have the stall bit (packets that circulate on the ring bus one or more times) according to a processing content. In this case, it is only necessary to calculate a correlation between an amount of input data and the number of generated stall packets.

In a second exemplary embodiment of the present invention, the components and processes having the similar function to those of the first exemplary embodiment are given the same reference symbols, and the description of the components and processes having the same configuration and function will be omitted.

Figure 9:
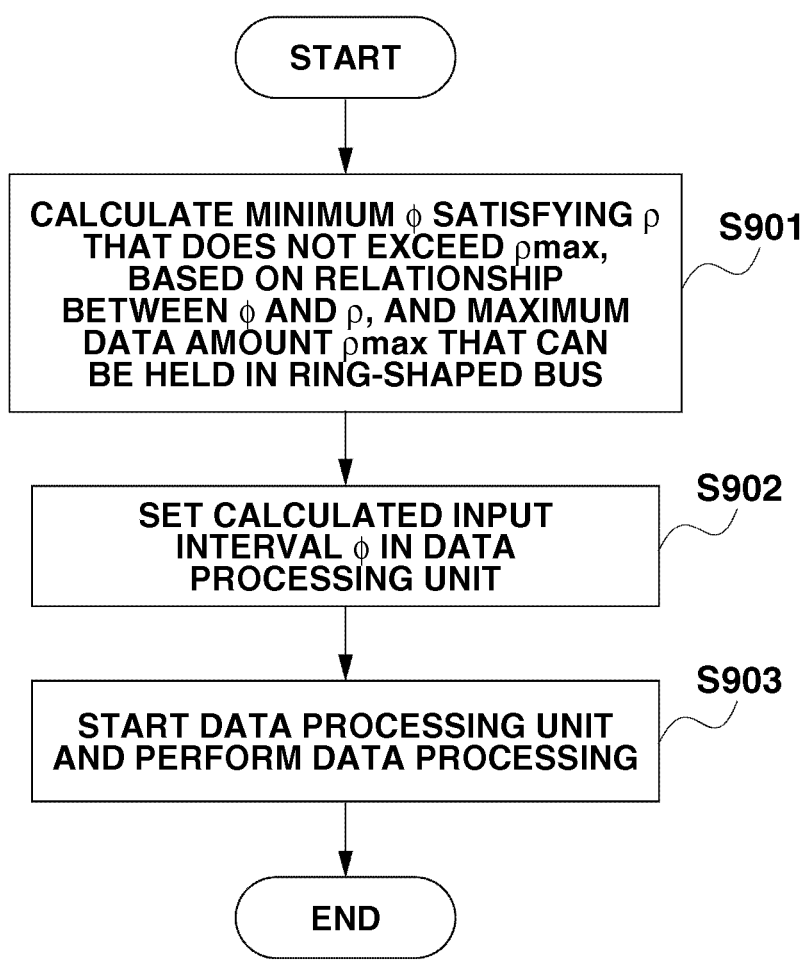
FIG. 9 is a flowchart illustrating the setting processing and the starting processing performed by the control processing unit on the information processing unit.

FIG. 9 is a flowchart illustrating the steps from when the control of the image processing unit 602 is performed by the control processing unit 601 to when the image processing is performed by the image processing unit 602.

In step S901, the setting value to be set in the image processing unit 602 is calculated. In step S902, the calculated interval is set in the information processing apparatus, and in step S903, the image processing unit 602 is started to perform the data processing.

In the first exemplary embodiment, the interval to be set is calculated by repeating steps S701 and S702. However, the second exemplary embodiment is different from the first exemplary embodiment in that the interval to be set is uniquely obtained in step S901. Further, in step S902, the interval calculated in step S901 is set in the information processing apparatus, and in step S903, the image processing unit 602 is started to perform the data processing.

The formulas (1) and (2) are equations for calculating the interval to be set in the data input/output unit in step S901, and represent a correlation between an amount of data input into the processing module per unit time and an amount of data output from the processing module per unit time. Here, $\phi_i$ is the interval of inputting data into the communication unit from the data input/output unit. $A_i$ and $B_i$ are respectively the performance values of the ith processing unit in a predetermined processing sequence.

Further, when assuming that the interval of data input into the ith processing unit in the predetermined processing sequence is $\phi_i$, and the interval of data output from the ith processing unit in the predetermined processing sequence is $\phi_{i+1}$, there is a relationship of $1/\phi_{i+1}=A_i(1/\phi_i-B_i)$, wherein $d_i$ is the interval from the ith processing unit to the (i+1)th processing unit in the predetermined processing sequence. ρmax is the maximum data amount that can be held by the processing modules on the ring bus, and δ is an error considering the error generated by the formula for calculating the data amount. In step S901, a smallest integer that satisfies the two formulas in FIG. 10 is obtained as Φ1.

As described above, according to the second exemplary embodiment, it is possible to further reduce the calculation cost by uniquely calculating the setting value using predetermined formulas.

$$\rho = \sum_{i=1}^{N}\left(\frac{\prod_{j=1}^{i-1}A_j}{\phi_1} - \left(\sum_{k=1}^{i-1}\left(\prod_{j=k}^{i-1}A_j\right)\times B_k\right)\right)\times d_i \quad (1)$$

$$\rho \leq \rho_{max} - \delta \quad (2)$$

Besides the configurations described in the above exemplary embodiments, data obtained from outside may be input in a packet form handled in the ring bus without change. Further, the processing unit may interpret the packet and process the packet directly. Although, in the above exemplary embodiments, an image processing apparatus is used as an example, the present invention can be applied to general information processing in which processing can be assigned to each processing module.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-112053 filed May 1, 2009, which is hereby incorporated by reference herein in its entirety.

What is claimed is:

1. An information processing apparatus including a data processing unit configured to process data and a control processing unit configured to control the data processing unit, the data processing unit comprising:

a plurality of communication units connected by a ring bus in a ring shape, wherein each of the plurality of communication units is directly connected to at least one processing unit or an input unit so that each communication unit can transmit/receive data to/from the at least one processing unit or the input unit, the input unit being directly connected to one communication unit, wherein the input unit is configured to receive data to be processed from an external storage unit and input the data into the ring bus at an interval, and wherein the data processing unit performs sequential processing by causing a plurality of processing units to perform processing in a predetermined order on the data input by the input unit, and the control processing unit comprising:

a holding unit configured to hold processing information indicating the predetermined order for the sequential processing and a processing content of each of the processing units to be used for the sequential processing among the plurality of processing units of the data processing unit;

a calculation unit configured to estimate an accumulated amount of data to be held on the ring bus according to the data to be input into the ring bus based on the processing information before starting the sequential processing; and a setting unit configured to set, before starting the sequential processing, the interval for the input unit to input the data based on the accumulated amount of data to be held so that the accumulated amount of data to be held is smaller than or equal to an amount of data that can be held on the ring bus.

2. The information processing apparatus according to claim 1, wherein the calculation unit calculates the accumulated amount of data to be held on the ring bus based on information indicating a positional relationship between logically continuous processing units in the sequential processing.

3. The information processing apparatus according to claim 2, wherein the information indicating the positional relationship indicates the number of communication units between two processing units that continuously process data in the sequential processing.

4. The information processing apparatus according to claim 2, wherein the calculation unit calculates the accumulated amount of data to be held on the ring bus based on information indicating performance of each of the processing units.

5. The information processing apparatus according to claim 4, wherein the information indicating the performance indicates a correlation between a data amount input into the processing unit per unit time and a data amount output from the processing unit per unit time.

6. The information processing apparatus according to claim 1, wherein the input unit controls an amount of the data to be input into the ring bus by adjusting the interval of inputting the data.

7. The information processing apparatus according to claim 1, wherein the input unit controls an amount of the data to be input into the ring bus by adjusting an amount of data to be input at a certain time.

8. The information processing apparatus according to claim 1, wherein the input unit controls an amount of the data to be input into the ring bus based on a control amount, and wherein the calculation unit calculates a correlation between a temporary control amount and the accumulated amount of data to be held on the ring bus, and calculates a control amount to be set in the input unit based on information indicating the correlation and on the amount of data that can be held on the ring bus.

9. The information processing apparatus according to claim 8, wherein the input unit further includes a register that stores the control amount.

10. The information processing apparatus according to claim 1, wherein the setting unit is configured to calculate a maximum data amount that can be held by the plurality of processing modules on the ring bus as the amount of data that can be held on the ring bus.

11. The information processing apparatus according to claim 1, wherein the setting unit is configured to calculate a maximum data amount that can be held by the plurality of communication units on the ring bus from a data amount of a packet including data to be circulated on the ring bus and a number of the communication units as the amount of data that can be held on the ring bus.

12. The information processing apparatus according to claim 1, wherein the calculation unit is configured to calculate the accumulated amount of data by accumulating an ith amount of data to be held which is calculated based on performance of the ith processing unit and on a movement amount between the ith processing unit and the (i+1)th processing unit, wherein i is a value greater than zero.

13. The information processing apparatus according to claim 1, wherein the predetermined order is different from an order in which the communication units corresponding to the plurality of processing units are physically connected.

14. The information processing apparatus according to claim 1, the control processing unit instructs the data processing unit to start the sequential processing after the setting unit completes setting the interval.

15. The information processing apparatus according to claim 1, wherein data flowing into the data processing unit is stored in a packet, and wherein a total number of packets held on the ring bus is constant.

16. The information processing apparatus according to claim 15, wherein the packet has a flag indicating that the data stored in the packet is valid data to be processed, and wherein the input unit inputs the data into the communication unit connected thereto at the set interval, and the communication unit connected to the input unit stores the data in a packet and transmits the packet with the flag indicating validity of data into a downstream side of the ring bus.

17. A non-transitory computer-readable storage medium that stores a program for causing a computer to operate as:

a data processing unit comprising:

a plurality of communication units connected by a ring bus in a ring shape, wherein each of the plurality of communication units is directly connected to at least one processing unit or an input unit so that each communication unit can transmit/receive data to/from the at least one processing unit or the input unit, the input unit being directly connected to one communication unit, wherein the input unit is configured to receive data to be processed from an external storage unit and input the data into the ring bus at an interval, and wherein the data processing unit performs sequential processing by causing a plurality of processing units to perform processing in a predetermined order on the data input by the input unit, and a control processing unit comprising:

a holding unit configured to hold processing information indicating the predetermined order for the sequential processing and a processing content of each of the processing units to be used for the sequential processing among the plurality of processing units of the data processing unit;

a calculation unit configured to estimate an accumulated amount of data to be held on the ring bus according to the data to be input into the ring bus based on processing information before starting the sequential processing; and a setting unit configured to set, before starting the sequential processing, the interval for the input unit to input the data based on the accumulated amount of data to be held so that the accumulated amount of data to be held is smaller than or equal to an amount of data that can be held on the ring bus.

18. An information processing method in an information processing apparatus including a data processing unit configured to process data and a control processing unit configured to control the data processing unit, the information processing method comprising:

providing a plurality of communication units connected by a ring bus in a ring shape, wherein each of the plurality of communication units is directly connected to at least one processing unit or an input unit so that each communication unit can transmit/receive data to/from the at least one processing unit or the input unit, the input unit being directly connected to one communication unit, wherein the input unit is configured to receive data to be processed from an external storage unit and input the data into the ring bus at an interval, wherein the data processing unit performs sequential processing by causing a plurality of processing units to perform processing in a predetermined order on the data input by the input unit, and causing a holding unit of the control processing unit to hold processing information indicating the predetermined order for the sequential processing and a processing content of each of processing units to be used for the sequential processing among the plurality of processing units of the data processing unit;

causing a calculating unit of the control processing unit to estimate an accumulated amount of data to be held on the ring bus according to the data to be input into the ring bus based on the processing information before starting the sequential processing; and causing a setting unit of the control processing unit to set, before starting the sequential processing, the interval for inputting the data based on the accumulated amount of data to be held so that the accumulated amount of data to be held is smaller than or equal to an amount of data that can be held on the ring bus.

19. An information processing apparatus comprising:

a plurality of processing modules;

a ring bus configured to directly connect the plurality of processing modules in a ring shape and circulate data in one direction; and an input unit configured to input data into the ring bus from an external storage unit, wherein sequential processing is performed by causing the plurality of processing modules to perform processing in a predetermined order, and wherein the input unit inputs data at an input interval, for inputting of data into the ring bus, wherein the input interval is set before starting the sequential processing so that an accumulated amount of data to be held on the ring bus, which is estimated based on the predetermined order for the sequential processing and a processing content of each of processing modules, held in a holding unit, to be used for the sequential processing among the plurality of processing modules, is smaller than or equal to an amount of data flowable on the ring bus from a storage unit different from the plurality of processing modules into the ring bus at the set input interval.

20. The information processing apparatus according to claim 19, wherein the external storage unit is different from the plurality of processing modules.

21. An information processing method in an information processing apparatus including a plurality of processing modules and a ring bus that directly connects the plurality of processing modules in a ring shape and circulates data in one direction, the information processing method comprising:

inputting data into the ring bus from external storage, performing sequential processing by causing the plurality of processing modules to perform processing in a predetermined order, and wherein the data is input at an input interval, for inputting of data into the ring bus, wherein the input interval is set before starting the sequential processing so that an accumulated amount of data to be held on the ring bus, which is estimated based on the predetermined order for the sequential processing and a processing content of each of processing modules, held in a holding unit, to be used for the sequential processing among the plurality of processing modules, is smaller than or equal to an amount of data flowable on the ring bus from a storage unit different from the plurality of processing modules into the ring bus at the set input interval.

22. A control device for controlling a data processing apparatus including a plurality of processing modules directly connected in a ring pattern and configured to process data in a predetermined order, the control device comprising:

a holding unit configured to hold processing information indicating the predetermined order for sequential processing and a processing content of each of processing modules to be used for the sequential processing among the plurality of processing modules, wherein the sequential processing is performed by each of the processing modules that performs processing of the processing content according to the predetermined order in a period from when the data is input into the data processing apparatus until when processed data is output from the data processing apparatus; and a setting unit configured to set an interval of inputting the data into the data processing apparatus based on the processing information, wherein the data processing apparatus comprises:

a plurality of communication units connected by a ring bus in a ring shape, wherein each of the plurality of communication units is directly connected to at least one processing module or an input unit so that each communication unit can transmit/receive data to/from the at least one processing module or the input unit, the input unit being directly connected to one communication unit, and wherein the input unit is configured to receive data to be processed from an external storage unit and input the data into the ring bus at an interval.

23. A control method for controlling a data processing apparatus including a plurality of processing modules directly connected in a ring pattern and configured to process data in a predetermined order, the method comprising:

holding processing information indicating the predetermined order for sequential processing and a processing content of each of processing modules to be used for the sequential processing among the plurality of processing modules, wherein the sequential processing is performed by each of the processing modules that performs processing of the processing content according to the predetermined order in a period from when the data is input into the data processing apparatus until when processed data is output from the data processing apparatus; and setting an interval of inputting the data into the data processing apparatus based on the processing information, wherein the data processing apparatus comprises:

a plurality of communication units connected by a ring bus in a ring shape, wherein each of the plurality of communication units is directly connected to at least one processing module or an input unit so that each communication unit can transmit/receive data to/from the at least one processing module or the input unit, the input unit being directly connected to one communication unit, and wherein the input unit is configured to receive data to be processed from an external storage unit and input the data into the ring bus at an interval.

* * * * *